(12) United States Patent
Cragun et al.

(10) Patent No.: US 8,959,444 B2
(45) Date of Patent: Feb. 17, 2015

(54) PRESENTING A NAVIGATION ORDER OF SHAPES

(75) Inventors: Brian J. Cragun, Rochester, MN (US); Makoto Kuwabara, Springfield, OR (US); James S. Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 12/968,987

(22) Filed: Dec. 15, 2010

(65) Prior Publication Data

US 2012/0159365 A1 Jun. 21, 2012

(51) Int. Cl.
*G06F 3/048* (2013.01)
*G06F 3/0482* (2013.01)
*G06F 9/44* (2006.01)

(52) U.S. Cl.
CPC ............ *G06F 3/0482* (2013.01); *G06F 9/4443* (2013.01)

USPC .......................................... 715/766; 715/767

(58) Field of Classification Search
CPC .................................. G06F 3/048; G06F 3/01
USPC .......................................... 715/767, 766, 769
See application file for complete search history.

(56) References Cited

U.S. PATENT DOCUMENTS

2005/0278654 A1* 12/2005 Sims ............................. 715/790
2010/0231606 A1* 9/2010 Nelson et al. ................. 345/619

* cited by examiner

*Primary Examiner* — Andrea Leggett
(74) *Attorney, Agent, or Firm* — Owen J. Gamon; Matthew C. Zehrer

(57) ABSTRACT

In an embodiment, a command is received that designates a base shape. A navigation order of a plurality of shapes relative to the base shape is determined, where the plurality of shapes are adjacent to the base shape. The navigation order is presented by presenting identifiers of the plurality of shapes and an ordered sequence of the plurality of shapes. Focus is moved between the plurality of shapes in the navigation order after the navigation order is presented.

22 Claims, 6 Drawing Sheets

PRESENTING A NAVIGATION ORDER OF SHAPES

FIELD

An embodiment of the invention generally relates to computer systems and more particularly to a user interface for a computer system that navigates to adjacent shapes in a navigation order.

BACKGROUND

Computer systems typically comprise a combination of computer programs and hardware, such as semiconductors, transistors, chips, circuit boards, storage devices, and processors. The computer programs are stored in the storage devices and are executed by the processors.

An important component of making computers easier to use was the development of sophisticated user interfaces, such as the Graphical User Interface (GUI). A GUI uses visual representations of common items to allow a user to operate a computer system. In most GUI-based computer systems, various icons, symbols, menus, or other visual indicators are manipulated or activated by a computer user via a pointing device (e.g., a mouse, a trackball, or track pad), which allows the user to give instructions to the computer. The computer typically translates the movement of the pointing device into movement of an animated arrow or pointer, sometimes called the mouse pointer, displayed on the computer screen. By moving the pointing device, the user may position the mouse pointer at various locations on the computer screen. Then, by activating a button on the pointing device, the user may invoke various commands and select various options.

Thus, in a GUI-based system, the user operates a pointing device and associated selection buttons instead of, or in addition to, a text or keyboard-based interface, in order to enter data and commands. Further, the computer system displays a variety of shapes, such as icons, pull-down menus, scroll bars, button bars, windows, and other visual indicators instead of, or in addition to, text, in order to represent the information, commands, and options available to the user.

SUMMARY

A method, computer-readable storage medium, and computer system are provided. In an embodiment, a command is received that designates a base shape. A navigation order of a plurality of shapes relative to the base shape is determined, where the plurality of shapes are adjacent to the base shape. The navigation order is presented by presenting identifiers of the plurality of shapes and an ordered sequence of the plurality of shapes. In an embodiment, the focus is moved separately from the presenting the navigation order. In another embodiment, focus is moved between the plurality of shapes in the navigation order after the navigation order is presented.

It is to be noted, however, that the appended drawings illustrate only example embodiments of the invention, and are therefore not considered a limitation of the scope of other embodiments of the invention.

DETAILED DESCRIPTION

Figure 1:
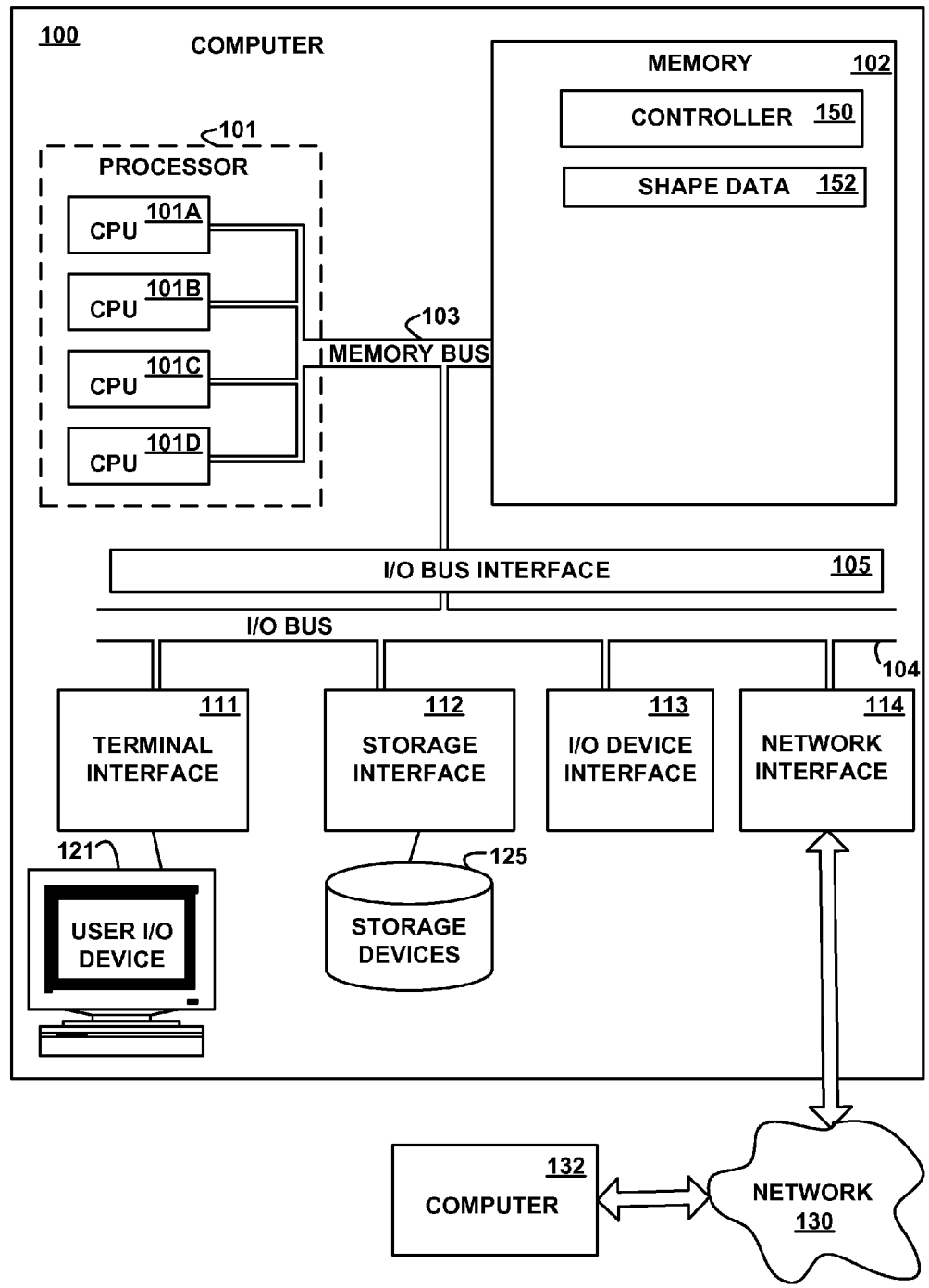
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores a controller 150 and shape data 152. Although the controller 150 and the shape data 152 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the controller 150 and the shape data 152 are not necessarily all completely contained in the same storage device at the same time. Further, although the controller 150 and the shape data 152 are illustrated as being separate entities, in other embodiments some of them, portions of some of them, or all of them may be packaged together.

In an embodiment, the controller 150 comprises instructions or statements that execute on the processor 101 or instructions or statements that are interpreted by instructions or statements that execute on the processor 101, to carry out the functions as further described below with reference to FIGS. 2A, 2B, 3, 4, and 5. In another embodiment, the controller 150 is implemented in hardware via semiconductor devices, chips, logical gates, circuits, circuit cards, and/or other physical hardware devices in lieu of, or in addition to, a processor-based system. In an embodiment, the controller 150 comprises data in addition to instructions or statements. In various embodiments, the controller 150 may be a user application, a third-party application, an operating system, or any portion, combination, or multiple thereof.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer 132 may comprise some or all of the program and hardware elements of the computer 100.

FIG. 1 is intended to depict the representative major components of the computer system 100, the network 130, and the computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2A:
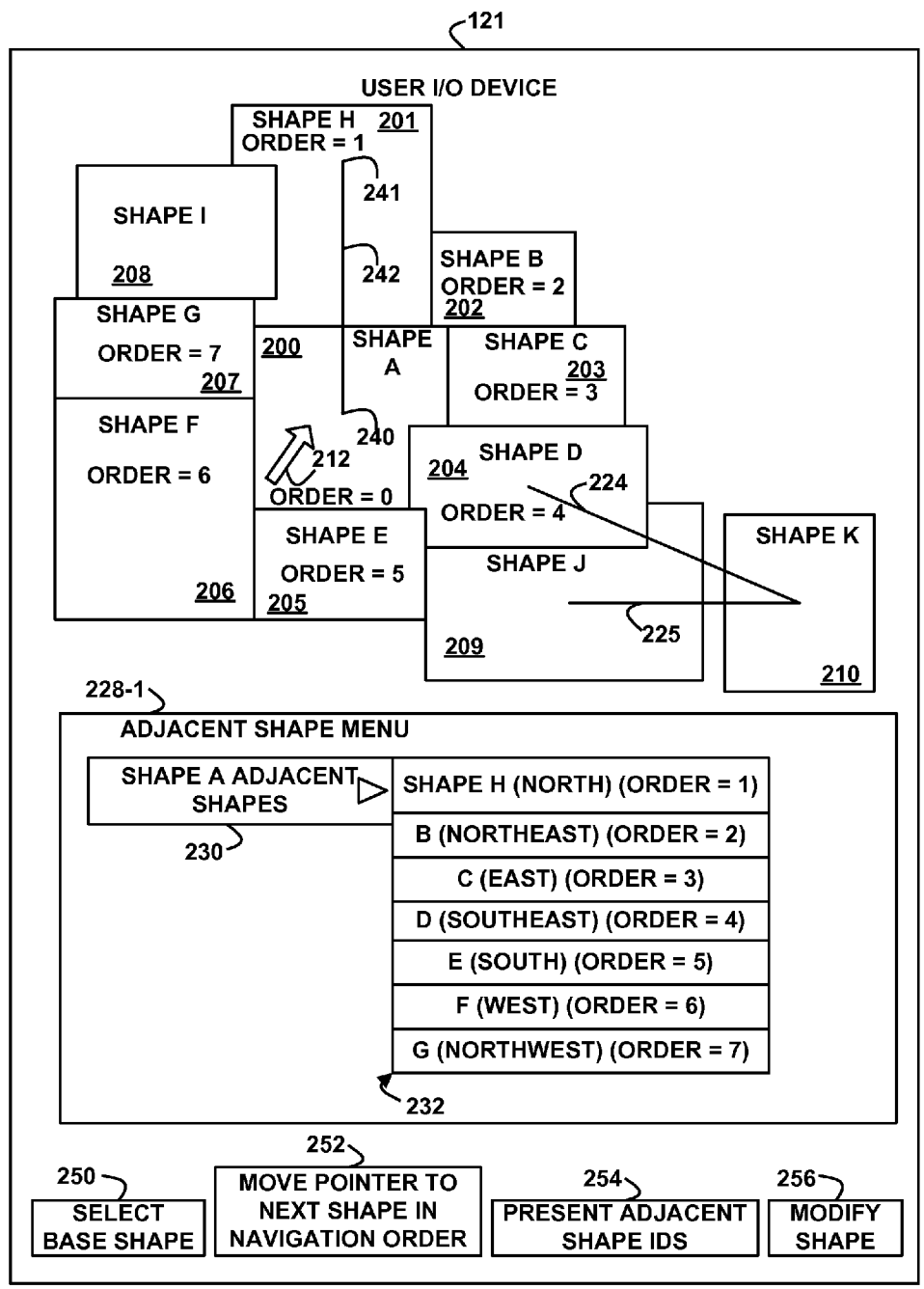
FIG. 2A depicts a block diagram of an example user interface presented via a user I/O (Input/Output) device, according to an embodiment of the invention.

FIG. 2A depicts a block diagram of an example user interface presented via the user I/O (Input/Output) device 121, according to an embodiment of the invention. The example user interface comprises the display of shapes 200, 201, 202, 203, 204, 205, 206, 207, 208, 209, and 210. In various embodiments, the shapes 200, 201, 202, 203, 204, 205, 206, 207, 208, 209, and 210 may be implemented as polygons, icons, a geographical map of states, provinces, countries, or regions, an organization chart of departments and personnel, or a spreadsheet having regular or irregular cell shapes.

The example user interface of FIG. 2A further comprises a pointer 212. The pointer 212 moves in response to movement of a user interface pointing device (e.g., a mouse, track pad, trackball, or keyboard key). In response to a press or click of a button on the pointing device, or in response to a navigation command received via the user I/O device 121 by the controller 150, the controller 150 selects the shape under which the pointer 212 is positioned and assigns focus to the selected shape. In the example of FIG. 2A, the pointer 212 has selected the shape A 200, which is in focus. Disclosed herein is a navigation technique implemented by the controller 150 that provides pointer movement to other shapes adjacent to the selected shape that currently has focus. This navigation technique provides a navigation order about (relative to) the selected shape A 200 of: first the shape H 201, which is followed by the shape B 202, which is followed by the shape C 203, which is followed by the shape D 204, which is followed by the shape E 205, which is followed by the shape F 206, which is finally followed by the shape G 207, all of which are adjacent to the shape 200. In an embodiment, the navigation order then wraps to the beginning, e.g., following the shape G 207, the navigation order wraps to the shape H 201, and so on. Thus, the navigation order comprises identifiers of the shapes and an ordered sequence of the shapes that navigation commands follow when processed by the controller 150. The navigation order relative to the shape 200 does not include the shape I 208, the shape J 209, and the shape K 210 because they are not adjacent to the shape 200. As illustrated in FIG. 2A, in an embodiment, the controller 150 presents the navigation order within the shapes via, e.g., "order=1" within the shape H 201, "order=2" within the B 202, etc., wherein the controller 150 presents indications of the navigation order as numerals representing the relative position of the respective shape within the navigation order. In another embodiment, the controller 150 may present the numerals or other indications of order outside or separate from the respective shapes, or connected to the respective shapes.

The selection of a shape or the assigning of focus to a shape means that the next operation, command, or function is performed on, or is directed to, the selected shape, or the selected shape with focus receives the next input. In various embodiments, the next input may originate from the user I/O device 121 or the from the controller 150, other application, an operating system, or the network 130. In various embodiments, the next input may be input data, an input command, or any multiple or combination thereof. In an embodiment, focus is withdrawn from one shape by moving focus to another shape. In an embodiment, the focus may be changed via a keyboard or other input device by a navigation command entered via the user I/O device 121, by selection via a designated key, such as a tab key or a right arrow key, which moves focus to the next focusable shape and the (shift+tab) keys or a left arrow key, which move focus to the previous focusable shape.

In an embodiment, the controller 150 uses a "focus follows click" (also known as "click to focus") policy, where the user clicks a button on the pointing device (e.g., a mouse) or submits a navigation command while the pointer 212 is over (inside, on, or within) the shape, in order for that shape to gain focus. Thus, in a click to focus policy, the current shape continues to retain focus (and receive input), even if the pointer 212 moves to another shape. Thus, moving a pointing device may move the pointer 212 without moving a cursor (if present) and without changing the focus, and a graphical user interface may comprise the pointer 212 in addition to, or in lieu of, a cursor. In another embodiment, the controller 150 uses a "focus follows mouse" (FFM) policy (also know as "follow focus"), where the focus automatically follows the current placement of the pointer 212 on the display screen of the user I/O device 121. One consequence of a focus follows mouse policy is that no shape has focus while the pointer 212 moves over the background, with no shape underneath the pointer 212.

The example user interface of FIG. 2A further comprises a display of an adjacent shape menu 228-1. The adjacent shape menu 228-1 comprises an identifier 230 of the selected shape A, which is in focus, and identifiers 232 of the shapes that are adjacent to the selected shape. The controller 150 presents the identifiers 232 of the shapes that are adjacent to the shape identified by the identifier 230 in response to selection of the shape identifier 230. The controller 150 presents the adjacent shape identifiers 232 in navigation order, (from top to bottom of the identifiers 232) and optionally presents the navigation order in the shape identifier, such as "order=1" in the identifier for the shape H, "order=2" in the identifier for the shape B, etc. Thus, the controller 150 presents the shape identifiers and the navigation order separate from the presentation of the shapes 201, 202, 203, 204, 205, 206, and 207 identified by the shape identifiers 232.

The controller 150 has displayed the shape identifiers 232 in the adjacent shape menu 228-1 from top to bottom in navigation order because the navigation order about, or relative to, the selected shape A 200 is, in an embodiment, the shape H 201, followed by the shape B 202, followed by the shape C 203, followed by the shape D 204, followed by the shape E 205, followed by the shape F 206, and finally followed by the shape G 207. The controller 150 further optionally displays directions that the shapes represented by the adjacent shape identifiers 232 are from the in focus shape, such as north (representing 0 degrees from vertical), northeast (representing 45 degrees from vertical), east (representing 90 degrees from vertical), southeast (representing 135 degrees from vertical), south (representing 180 degrees from vertical), west (representing 270 degrees from vertical), and northwest representing 315 degrees from vertical). In another embodiment, the controller 150 displays the degrees of the angles that the shapes are from vertical, calculated from centroid to centroid of the shapes). Selection of any of the respective identifiers 232 causes the controller 150 to move the pointer 212 to the respective shape identified by the respective shape identifier, without giving focus to the shape identified by the respective identifier. In another embodiment, selection of one of the respective identifiers 232 causes the controller 150 to also give focus to the shape identified by the selected identifier.

The user interface further comprises a select base shape command 250, a move pointer to next shape command 252, a present adjacent shape identifiers command 254, and a modify shape command 256. Although the select base shape command 250, the move pointer to next shape command 252, the present adjacent shape identifiers command 254, and the modify shape command 256 are illustrated as buttons that are selected and submitted to the controller 150 via the pointer 212 and a pointing device, in other embodiments, they may be implemented as widgets, dials, menu options, keyboard presses, commands on a command line, or may be spoken into an microphone and recognized and submitted to the controller 150 via speech recognition or speech-to-text techniques.

The select base shape command 250 requests that the controller 150 select and give focus to the specified shape, establishing the selected shape as the base shape about which the controller 150 determines and establishes a navigation order of shapes. The move pointer to next shape command 252 requests that the controller 150 move the pointer 212 from the current shape to another shape, in a navigation order of shapes about the base shape, which was previously established via the select base shape command 250.

In an embodiment where the controller 150 implements the "click to focus" policy, a separate select base shape command 250 is optional or unnecessary, and the controller 150 may accomplish the selection of a base shape via the selection of a shape that gives focus to the shape, such as via selecting a button on a pointing device. Further, in the "click to focus" policy, in response to the move pointer to next shape command 252, the controller 150 moves the pointer 212 from the current shape to another shape in the navigation order, but the controller 150 does not change the shape that is in focus in response to the move pointer to next shape command 252.

In an embodiment where the controller 150 implements the "focus follows mouse" policy, the select base shape command 250 is separate from a command that requests the giving of focus to a shape, i.e., a shape may be given focus without using the select base shape command 250, and the controller 150 implements the move pointer to next shape command 252 by moving the pointer 212 and by moving focus from a current shape to a next shape, in the navigation order.

The present adjacent shape identifiers command 254 requests that the controller 150 present identifiers of the shapes that are adjacent to the selected shape. In an embodiment, the controller 150 presents the adjacent shape identifiers via presentation of the adjacent shape menu 228-1 (or via the adjacent shape menu 228-2 of FIG. 2B), which includes the navigation order, adjacency information, and traversal path information for the shapes in the presentation of the identifiers 230 and 232 and the order of the individual identifiers within the identifiers 232. The adjacent shape menu 228-1 may be presented by display of the adjacent shape menu 228-1 via a display screen of the user I/O device 121, or may be presented by being spoken via an audio speaker of the user I/O device 121, using text-to-speech techniques. Thus, in an embodiment, a user does not need to be able to view the shapes, in order to learn the navigation order, adjacency information, and the traversal path information.

The modify shape command 256 requests that the selected in-focus shape be modified, such as changing the size, dimensions, or data assigned to the shape. The modify shape command 256 is an example of a command, the selection of which supplies input data or an input command to the shape that is currently in focus, and the modify operation is an example of any number of potential operation commands that effect the shape.

The controller 150 determines the navigation order of shapes about, or relative to, a base shape based on the adjacency of shapes. In an embodiment, a first shape and a second shape are adjacent to each other if the first shape and the second shape share a common border, edge, or side. In another embodiment, a first shape and a second shape are adjacent to each other if a line drawn between the center of the first shape and the second shape does not intersect any portion of any other third shape, i.e. no other third shape intervenes between the first shape and the second shape. Using the example of FIG. 2A, the shape D 204 and the shape K 210 are not adjacent because the line 224 drawn between their centers intersects the intervening shape J 209; the shape J 209 and the shape K 210 are adjacent to each other because the line 225 drawn between their centers does not intersect any intervening shape, even though the shape J 209 and the shape K 210 do not share a common border or edge.

In an embodiment, the controller 150 determines adjacency, as follows. Consider a shape that is implemented a polygon made up of line segments between n vertices, $(x_i, y_i)$, i=0 to n−1, in a Cartesian coordinate system, where $x_i$ is a coordinate on a x-axis (a horizontal axis) and $y_i$ is a coordinate on a y-axis (a vertical axis). The last vertex $(x_{n-1}, y_{n-1})$ is the same as the first vertex, $(x_0, y_0)$, meaning that the polygon is closed.

In an embodiment, the controller 150 calculates the area, A, of the polygon via the equation:

$$A = \frac{1}{2} \sum_{i=0}^{N-1} (x_i y_{i+1} - x_{i+1} y_i)$$

In an embodiment, the controller 150 calculates the coordinates $(c_x, c_y)$ of the centroid (also known as the center of mass, the center of gravity, or the center) of the polygon via the equations:

$$c_x = \frac{1}{6A} \sum_{i=0}^{N-1} (x_i + x_{i+1})(x_i y_{i+1} - x_{i+1} y_i)$$

$$c_y = \frac{1}{6A} \sum_{i=0}^{N-1} (y_i + y_{i+1})(x_i y_{i+1} - x_{i+1} y_i)$$

In an embodiment, the controller 150 determines a point 241 that is on a vertical line 242 from the centroid 240 $(c_x, c_y)$ of the selected base shape 200 and represents that point 241 as a vector emanating from the centroid 240 of the selected base shape 200. The controller 150 then determines the centroids of all of the other displayed shapes 201, 202, 203, 204, 205,

206, 207, 208, 209, and 210 in the user interface and represents all of the centroids of all of the shapes as respective vectors emanating from the centroid 240 of the selected base shape 200. The controller 150 then determines the adjacent shapes 201, 202, 203, 204, 205, 206, and 207 to the base shape 200 by finding the vectors that do not intersect a line segment of any intervening shape. If a vector (line) that starts at the centroid of a first base shape and ends at the centroid of a second shape does not intersect a line segment of any other shape, then the second shape is adjacent to the first base shape. If a vector (line) that starts at the centroid of a first base shape and ends at the centroid of a second shape intersects a line segment of any other shape, then the second shape is not adjacent to the first base shape.

The controller 150 then calculates the respective angle between each of the respective vectors (representing the respective centroid of the respective adjacent shape) and the vertical line 242. In an embodiment, the controller 150 calculates the angles by calculating the inverse cosine of the dot product (using matrix arithmetic) of the vectors, but in other embodiments, the controller 150 may use complex numbers or any other appropriate technique for calculating the angles. The controller 150 then orders the vectors by angle value in ascending order, to yield the clockwise navigation order, starting from the vertical line 242. Analogously, the controller 150 may order the vectors in descending angle order, to yield the counter-clockwise navigation order, starting from the vertical line 242.

Figure 2B:
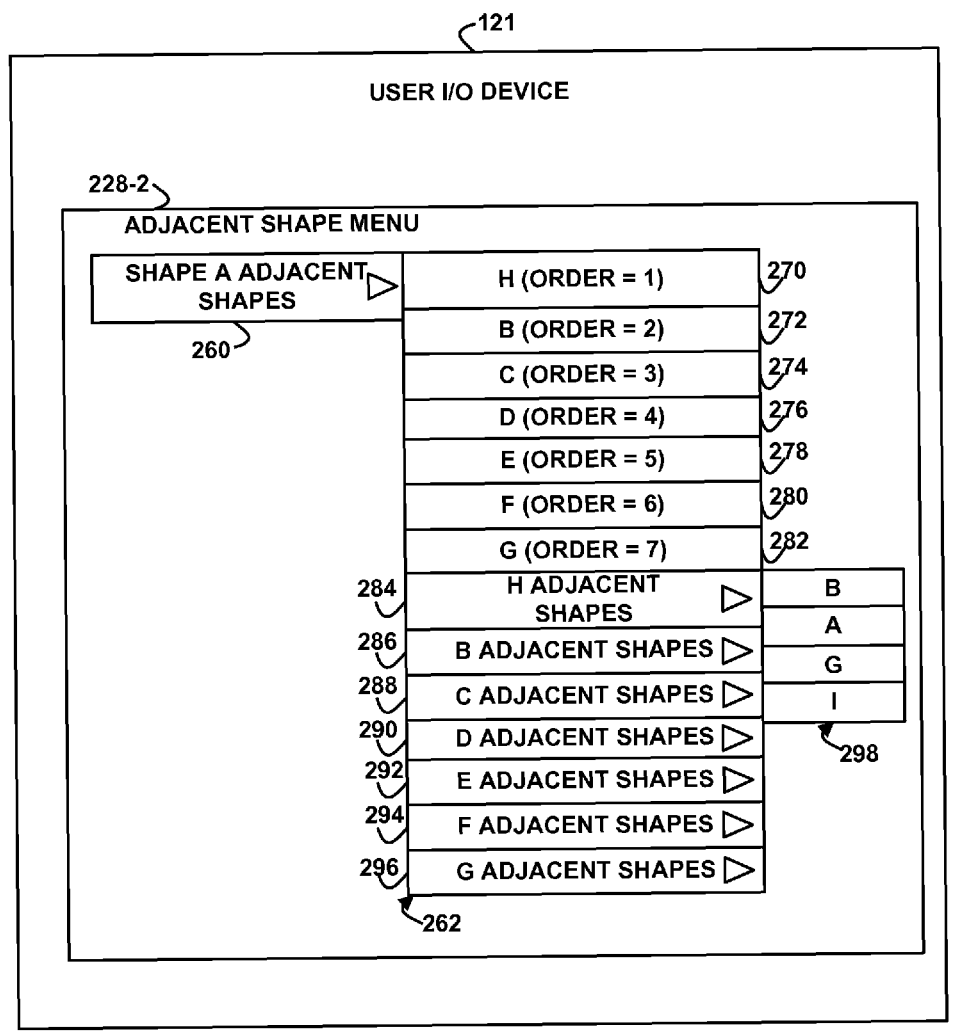
FIG. 2B depicts a block diagram of an example user interface for an adjacent shape menu presented via a user I/O (Input/Output) device, according to an embodiment of the invention.

FIG. 2B depicts a block diagram of an example user interface for an adjacent shape menu 228-2 presented via the user I/O (Input/Output) device 121, according to an embodiment of the invention.

The adjacent shape menu 228-2 comprises an identifier 260 of the shape A that is in focus, identifiers 262 of the shapes that are adjacent to the shape A, and identifiers 298 of the shapes that are adjacent to the shape H, which is identified by the identifier 284, which is one of the identifiers 262. The identifiers 262 comprise the shape identifiers 270, 272, 274, 276, 278, 280, 282, 284, 286, 288, 290, 292, 294, and 296. Selection of any of the identifiers 270, 272, 274, 276, 278, 280, 282 sends a move command to the controller 150, which causes the controller 150 to move the pointer 212 to the respective shape identified by the selected identifier. Selection of any of the identifiers 284, 286, 288, 290, 292, 294, or 296 sends a present adjacent shape identifiers command to the controller 150, which causes the controller 150 to display the identifiers of the shapes adjacent the shape identified by the selected identifier. For example, selection of the identifier 284 causes the controller to display the identifiers 298 of the shapes B, A, G, and I (in navigation order about the selected shape H as if the selected shape H were in focus) because the shapes B, A, G, and I are adjacent to the selected shape H. The level of indirection for the adjacency of shapes may continue indefinitely or to any appropriate degree. In an embodiment, the controller 150 presents the adjacent shape menu 228-2, including the navigation order and adjacency information independently from, prior to, or after the receipt of or the processing of the select base shape command 250, the move pointer command 252, and the movement of a pointing device, as previously described above with reference to FIG. 2A. Thus, the user does not necessarily need to move the pointer 212 through the navigation order of the shapes to learn the navigation order.

The adjacent shape menu 228-2 provides traversal path information, comprising identifiers of shapes and the navigation order in which adjacent shapes may be traversed or navigated via the changing of focus or the moving of the pointer 212. For example, the adjacent shape menu 228-2 presents a traversal path of shape A to shape H, to shape B, to shape C, to shape D, to shape E, to shape F, to shape G, which may be traversed by selecting the base shape of shape A and then repeatedly selecting the move pointer command. As another example, the adjacent shape menu 228-2 presents a traversal path of shape A to shape H, to shape B, to shape A, to shape G, to shape I, which may be traversed by selecting the base shape of shape A via the select base shape command, moving focus to shape H in the navigation order via the move pointer command 252, selecting the shape H as the base shape via the select base shape command 250, and then moving the selection of shapes in the navigation order about the shape H (in the navigation order of the identifiers 298). Traversal path information may be presented, in lieu of, or in addition to the adjacent shape menu 228-2, between the shapes via a selectable menu or table at a level of indirection specified by the user via the user I/O device 121.

In various embodiments, the shape identifiers 284, 286, 288, 290, 292, 294, and 296 may be presented separate from, interspersed with, or as a part of the shape identifiers 270, 272, 274, 276, 278, 280, and 282. The shape identifiers 260, 262, and/or 298 may further comprise indicia of whether adjacent shapes are physically adjacent (sharing a common border) versus logically adjacent (adjacent but not sharing a common border). The indicia may comprise symbols, text, fonts, sounds, or any other appropriate indicia.

Figure 3:
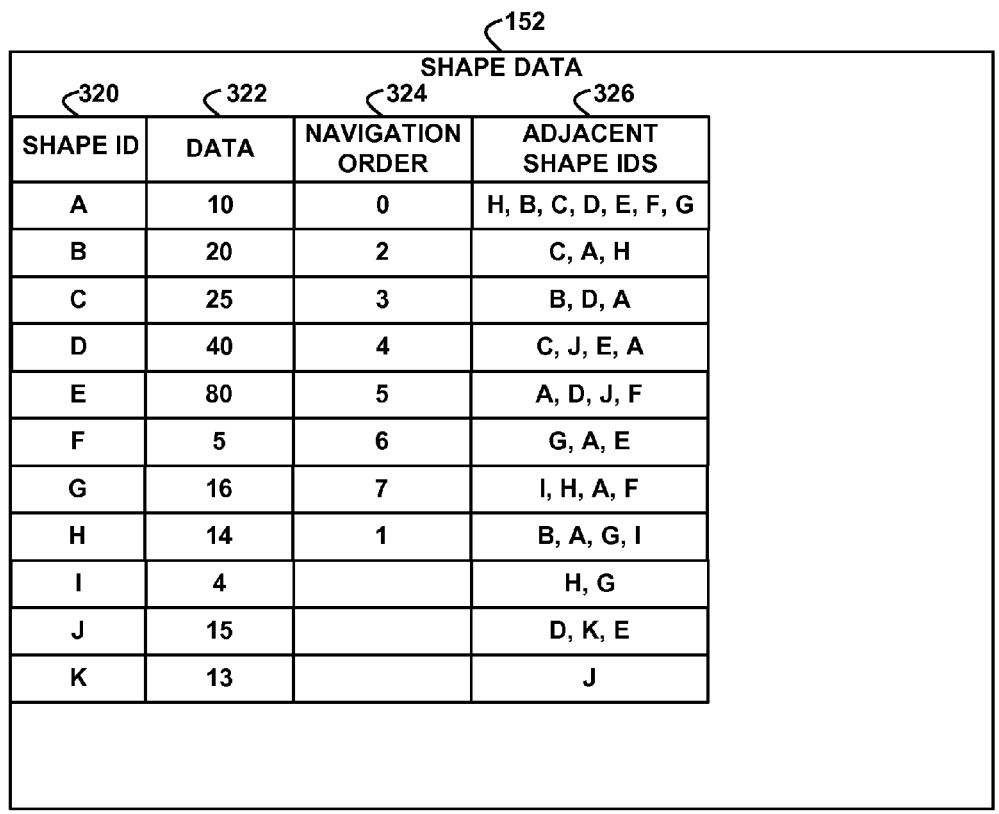
FIG. 3 depicts a block diagram of an example data structure for shape data, according to an embodiment of the invention.

FIG. 3 depicts a block diagram of an example data structure for the shape data 152, according to an embodiment of the invention. The shape data 152 comprises example records, each comprising an example shape identifier field 320, an example data field 322, an example navigation order field 324, and an example adjacent shape identifiers field 326.

The shape identifier field 320 identifies shapes that are displayed in the user interface of FIG. 2A, such as the shapes 200, 201, 202, 203, 204, 205, 206, 207, 208, 209, or 210. The example data field 322 identifies data that is displayed within or represented by the shape identified by the shape identifier field 320 in the same record. In an embodiment, the controller 150 may present the data specified in the data field 322 via the user interface of FIG. 2A in individual form as part of, as connected to, or as associated with the respective shape, or in total or aggregate form, or in the form of an arithmetic or statistical function, such as an average, mean, median, or standard deviation.

The example navigation order field 324 specifies the order of navigation of the shape identified by the shape identifier field 320 in the same record, starting at the base shape and relative to all other shapes represented by other records in the shape data 152. The navigation order field 324 specifies a sequence of the shapes in the order that the pointer 212 moves starting at, or relative to, the shape that has focus, in response to the move pointer command 252 or other navigation command. In various embodiments, the navigation order may be clockwise about the in-focus shape; counter-clockwise about the in-focus shape; in alphabetical order of the shape identifiers 320; in reverse alphabetical order of the shape identifiers 320; in ascending size order of the area of the shapes; in descending size order of the area of the shapes; in ascending order of the data 322; in descending order of the data 322; from most recently visited (by the pointer 212 being placed on, over, or at the respective shape) to least recently visited; from least recently visited (by the pointer 212 being placed on, over, or at the respective shape) to most recently visited; from most frequently visited (by the pointer 212 being placed on, over, or at the respective shape) to least frequently visited; from least frequently visited (by the pointer 212 being placed on, over, or at the respective shape) to most frequently visited; or any other appropriate metric.

If the navigation order field 324 specifies zero, then the shape identified by the shape identifier field 320, in the same record, is the base shape, to which the navigation order 324 of all the other shapes are relative. In the example of FIG. 3, the navigation order 324 of the shape A is zero, identifying the shape A 200 (FIG. 2A) as the base shape. The controller 150 changes the shape data 152 in response to different shapes becoming in focus.

If the navigation order field 324 is empty or comprises no value, then the shape identified by the shape identifier field 320 in the same record is not adjacent to the base shape, so the shape with the empty navigation order field 324 has no navigation order relative to the base shape. In the example of FIG. 3, the navigation order 324 of the shapes I, J, and K are empty, identifying the shape I 208, the shape J 209, and the shape K 210 as not adjacent to the base shape A 200 (FIG. 2A).

The example adjacent shape identifiers field 326 specifies the identifiers of the shapes that are adjacent to the shape identified by the shape identifier 320, in the same record and are in navigation order, as if the shape identifier 320 in the record were the base shape.

Figure 4:
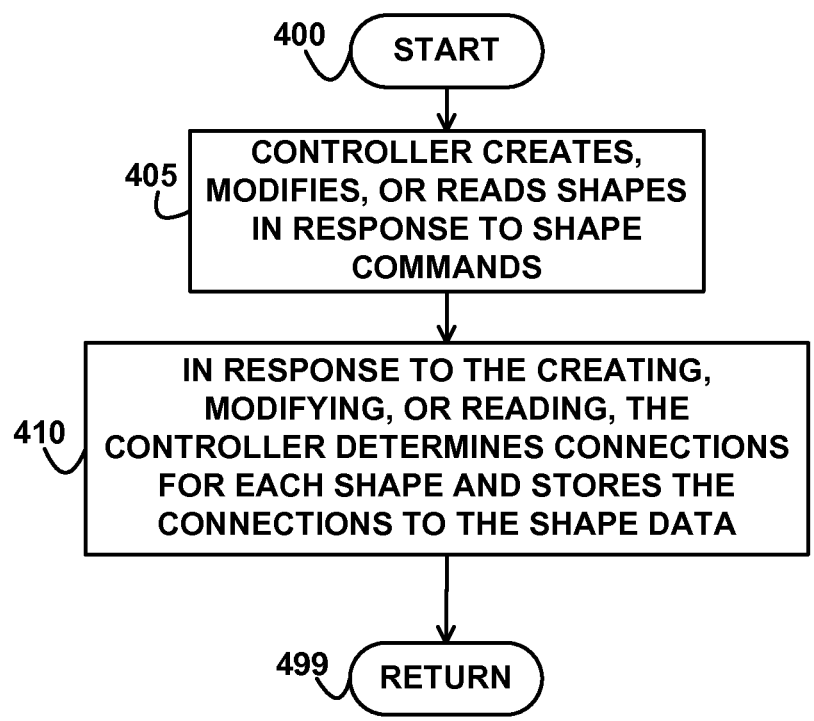
FIG. 4 depicts a flowchart of example processing for accessing shapes, according to an embodiment of the invention.

FIG. 4 depicts a flowchart of example processing for accessing shapes, according to an embodiment of the invention. Control begins at block 400. Control then continues to block 405 where the controller 150 creates, modifies, or reads shapes in response to shape commands. In various embodiments, the controller 150 receives the shape commands from the user I/O device 121, from instructions executing on the processor 101, or from the computer 132 via the network 130.

Control then continues to block 410 where, in response to the creating, modifying, or reading of the shapes, the controller 150 determines the data 322, the navigation order 324, and the adjacent shape identifiers 326 for each shape, as previously described above, and stores the determined data 322, the navigation order 324, and the adjacent shape identifiers 326 to the shape data 152.

Control then continues to block 499 where the logic of FIG. 4 returns. In various embodiments, the logic of FIG. 4 may be performed any number of the times for the same or different create, modify, or read shape commands and for the same or different shapes.

Figure 5:
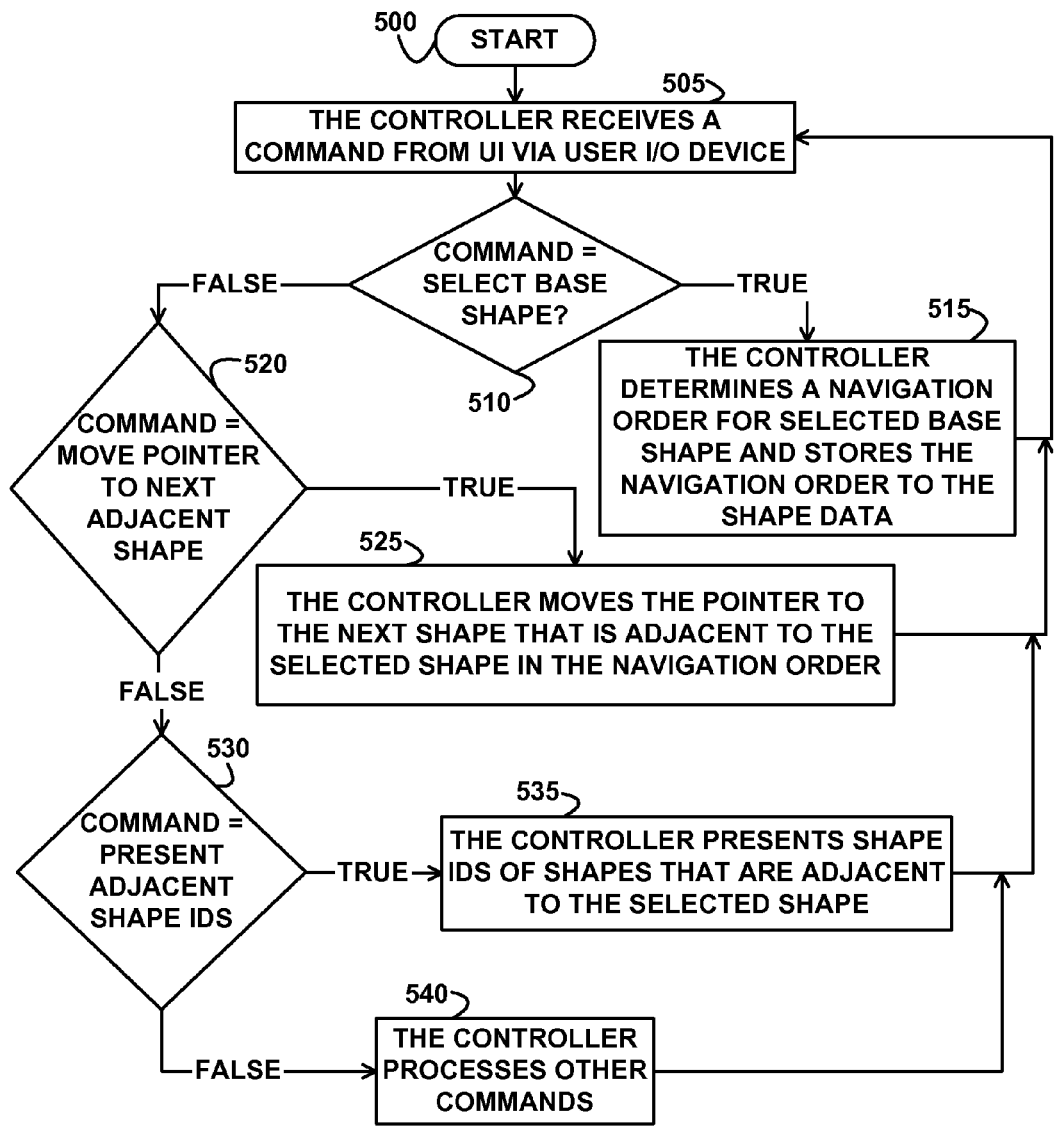
FIG. 5 depicts a flowchart of example processing for processing shape commands, according to an embodiment of the invention.

FIG. 5 depicts a flowchart of example processing for processing shape commands, according to an embodiment of the invention. In an embodiment, the logic of FIG. 5 may be performed concurrently, substantially, concurrently, or interleaved with the logic of FIG. 4, executed on the same or a different processor via multi-threading, multi-tasking, multi-processing, or multi-programming techniques. In an embodiment, the logic of FIG. 5 executes until terminated or until a command is received requesting that it return to its invoker.

Control begins at block 500. Control then continues to block 505 where the controller 150 receives a command from a user interface via the user I/O device 121. Control then continues to block 510 where the controller 150 determines whether the received command is a select base shape command that requests selecting a shape that is displayed via the user interface for designation as a base shape.

If the determination at block 510 is true, then the received command is a select base shape command that requests selecting a shape that is displayed via the user interface and designating the selected shape as a base shape, so control continues to block 515 where the controller 150 designates the shape at which the pointer points as the base shape, determines a navigation order for the shapes that are adjacent to the selected base shape, and stores the navigation order to the shape data 152. Control then returns to block 505 where the controller 150 receives the same or a different command from the user interface via the user I/O device 121, as previously described above.

If the determination at block 510 is false, then the received command is not a select base shape command, so control continues to block 520 where the controller 150 determines whether the received command is a move pointer command that requests moving the pointer to the next adjacent shape (adjacent to the base shape) in the navigation order about a base shape. If the determination at block 520 is true, then the received command is a move pointer to next adjacent shape command, so control continues to block 525 where the controller 150 moves the pointer on the display screen of the user I/O device 121 from a current shape to the next shape that is adjacent to the base shape, in the navigation order for the base shape. In various embodiments, the controller 150 moves the pointer 212 and changes focus from the current shape at which the pointer 212 is positioned to the next shape in the navigation order or moves the pointer 212 to the next shape in the navigation order and does not change focus to the next shape. Control then returns to block 505 where the controller 150 receives the same or a different command from the user interface via the user I/O device 121, as previously described above.

If the determination at block 520 is false, then the received command is not a move pointer to the next adjacent shape command, so control continues to block 530 where the controller 150 determines whether the received command is a present adjacent shape identifiers command. If the determination at block 530 is true, then the received command is a present adjacent shape identifiers command, so control continues to block 535 where the controller 150 displays or presents the shape identifiers that identify the shapes that are adjacent to the base shape, or adjacent to any other selected or requested shape, via the adjacent shape menu 228-1 or 228-2 (FIG. 2A or 2B, respectively). Control then returns to block 505 where the controller 150 receives the same or a different command from the user interface via the user I/O device 121, as previously described above.

If the determination at block 530 is false, then the received command is not a present adjacent shape identifiers command, so control continues to block 540 where the controller 150 processes other commands. Other commands, may include, e.g., a command that requests presenting different shapes or performing operations or functions on the shapes. Control then returns to block 505 where the controller 150 receives the same or a different command from the user interface via the user I/O device 121, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   receiving, via a processor, a command that designates a base shape of a first plurality of displayed shapes;
   determining, via the processor, a navigation order of the first plurality of displayed shapes relative to the base shape by determining one or more shapes of the first plurality of displayed shapes for which a respective line from a center of each of the one or more shapes to a center of the base shape intersects an intervening shape, wherein the navigation order specifies a focus sequence of the first plurality of displayed shapes;
   presenting, via the processor, the navigation order, wherein the presenting the navigation order further comprises presenting identifiers of the first plurality of displayed shapes; and
   moving, via the processor, focus between the first plurality of displayed shapes in the navigation order, wherein the moving the focus moves the focus separate from the presenting the navigation order.

2. The method of claim 1, wherein the presenting the navigation order further comprises the processor presenting the navigation order via a speaker.

3. The method of claim 1, wherein the presenting the navigation order further comprises:
   presenting, via the processor, the navigation order prior to moving the focus; and
   presenting, via the processor, identifiers of a second plurality of displayed shapes that are adjacent to a selected one of the first plurality of displayed shapes.

4. The method of claim 1, wherein the determining the navigation order further comprises:
   determining, via the processor, the first plurality of displayed shapes that are adjacent to the base shape.

5. The method of claim 4, wherein the determining the first plurality of displayed shapes that are adjacent to the base shape further comprises:
   determining, via the processor, the first plurality of displayed shapes that share a border with the base shape.

6. The method of claim 1, wherein the determining the navigation order further comprises:
   determining, via the processor, the navigation order of the first plurality of displayed shapes to be clockwise about the base shape.

7. The method of claim 6, wherein determining the navigation order of the first plurality of displayed shapes to be clockwise about the base shape further comprises:
   calculating, via the processor, angles between each of the respective lines and a reference line;
   ordering, via the processor, the respective lines by angle in ascending order to yield the clockwise navigation order.

8. The method of claim 1, wherein the determining the navigation order further comprises:
   determining, via the processor, the navigation order of the first plurality of displayed shapes to be counter-clockwise about the base shape.

9. The method of claim 8, wherein determining the navigation order of the first plurality of displayed shapes to be counter-clockwise about the base shape further comprises:
   calculating, via the processor, angles between each of the respective lines and a reference line;
   ordering, via the processor, the respective lines by angle in descending order to yield the counter-clockwise navigation order.

10. The method of claim 1, wherein at least one of the first plurality of displayed shapes does not share a border with the base shape.

11. The method of claim 1, wherein the displayed shapes are visual indicators that may be respectively manipulated whereupon a command instruction is received by the processor.

12. A computer-readable storage medium encoded with instructions, wherein the instructions when executed by a processor cause the processor to:
   receive a command that designates a base shape of a first plurality of displayed shapes;
   determine a navigation order of the first plurality of displayed shapes relative to the base shape by determining one or more shapes of the first plurality of displayed shapes for which a respective line from a center of each of the one or more shapes to a center of the base shape intersects an intervening shape, wherein the instructions for determining the navigation order further cause the processor to determine the first plurality of displayed shapes that are adjacent to the base shape, wherein the navigation order specifies a focus sequence of the first plurality of displayed shapes;
   present the navigation order, wherein the instructions for presenting the navigation order further cause the processor to present identifiers of the first plurality of displayed shapes; and
   move focus between the first plurality of displayed shapes in the navigation order after the navigation order is presented.

13. The computer-readable storage medium of claim 12, wherein the program instructions for presenting the navigation order further cause the processor to:
   present the navigation order via a speaker.

14. The computer-readable storage medium of claim 12, wherein the program instructions for determining the navigation order further cause the processor to:
   determine the navigation order of the first plurality of displayed shapes to be clockwise about the base shape.

15. The computer-readable storage medium of claim 12, wherein the program instructions for determining the navigation order further cause the processor to:
   determine the navigation order of the first plurality of displayed shapes to be counter-clockwise about the base shape.

16. The computer-readable storage medium of claim 12, wherein the program instructions for determining the first plurality of displayed shapes that are adjacent to the base shape further cause the processor to:
determine the first plurality of displayed shapes that share a border with the base shape.

17. The computer-readable storage medium of claim 12, wherein the displayed shapes are visual indicators that may be respectively manipulated whereupon a command instruction is received by the processor.

18. A computer comprising:
a processor; and
memory communicatively coupled to the processor, wherein the memory is encoded with instructions, and wherein the instructions when executed on the processor comprise
receiving a command that designates a base shape of a first plurality of displayed shapes,
determining a navigation order of the first plurality of displayed shapes relative to the base shape by determining one or more shapes of the first plurality of displayed shapes for which a respective line from a center of each of the one or more shapes to a center of the base shape intersects an intervening shape, wherein the determining the navigation order further comprises determining the first plurality of shapes that are adjacent to the base shape, and wherein the navigation order specifies a focus sequence of the first plurality of displayed shapes presenting the navigation order via a speaker, wherein the presenting the navigation order further comprises presenting identifiers of the first plurality of displayed shapes, and
moving focus between the first plurality of displayed shapes in the navigation order after the presenting the navigation order.

19. The computer of claim 18, wherein the determining the navigation order further comprises:
determining the navigation order of the first plurality of displayed shapes to be clockwise about the base shape.

20. The computer of claim 18, wherein the determining the navigation order further comprises:
determining the navigation order of the first plurality of displayed shapes to be counter-clockwise about the base shape.

21. The computer of claim 18, wherein the determining the first plurality of shapes that are adjacent to the base shape further comprises:
determining the first plurality of displayed shapes that share a border with the base shape.

22. The computer of claim 18, wherein the displayed shapes are visual indicators that may be respectively manipulated whereupon a command instruction is received by the processor.

* * * * *